United States Patent
de los Reyes

(10) Patent No.: US 8,872,781 B1
(45) Date of Patent: Oct. 28, 2014

(54) METHOD AND SYSTEM FOR FILTERING MOVEMENTS ON A TRACKPAD

(75) Inventor: Andrew de los Reyes, Belmont, CA (US)

(73) Assignee: Google Inc., Mountain View, CA (US)

( * ) Notice: Subject to any disclaimer, the term of this patent is extended or adjusted under 35 U.S.C. 154(b) by 182 days.

(21) Appl. No.: 13/534,814

(22) Filed: Jun. 27, 2012

(51) Int. Cl.
*G06F 3/041* (2006.01)

(52) U.S. Cl.
USPC ........................................................ 345/173

(58) Field of Classification Search
CPC ............ G06F 2203/04101; G06F 2203/04104; G06F 2203/04808; G06F 3/0235; G06F 3/041; G06F 3/0412; G06F 3/044; G06F 3/04815; G06F 3/04845; G06F 3/0485; G06F 3/0488; G06F 3/04883; G06F 3/04886
USPC ........................................................ 345/173
See application file for complete search history.

(56) References Cited

U.S. PATENT DOCUMENTS

| | | | |
|---|---|---|---|
| 7,339,580 | B2 | 3/2008 | Westerman et al. |
| 2007/0081726 | A1 | 4/2007 | Westerman et al. |
| 2009/0174675 | A1 | 7/2009 | Gillespie et al. |
| 2010/0182265 | A1* | 7/2010 | Kim et al. ...................... 345/173 |
| 2011/0029185 | A1* | 2/2011 | Aoki et al. ...................... 701/29 |
| 2012/0007821 | A1 | 1/2012 | Zaliva |
| 2012/0275642 | A1* | 11/2012 | Aller et al. ..................... 382/100 |

* cited by examiner

*Primary Examiner* — Viet Pham
(74) *Attorney, Agent, or Firm* — Brake Hughes Bellermann LLP

(57) ABSTRACT

A trackpad system to filter movement includes a surface, a sensor operably coupled to the surface, a controller operably coupled to the sensor, a bus operably coupled to the controller, a device driver configured to communicate with the bus, and a gesture module configured to communicate with the device driver. The gesture module includes instructions to determine if each contact detected on the surface for an input frame was previously present on the surface. If the contact was previously present on the surface, the system computes, for each axis, position changes for the contact based on a record associated with the contact. The system determines if the position changes are unexpected based on a set of rules. If the position changes are unexpected, the system suppresses a display of movement associated with the contact for the input frame for the axis.

20 Claims, 13 Drawing Sheets

METHOD AND SYSTEM FOR FILTERING MOVEMENTS ON A TRACKPAD

FIELD

This application relates to an input device for use with a computing device, such as a trackpad, and more specifically, to filtering movements such as finger input on a trackpad.

BACKGROUND

Some computing devices, such as laptop computers, include one or more input devices, such as a mouse, a keyboard, or a touch screen. Various computing devices include a trackpad or touchpad that can be used in place of or in addition to a mouse to maneuver a curser on a computer screen, or to trigger one or more functions of a computing device. Such trackpads or touchpads can be coupled to, or integrated within, the computing device.

A touchpad (also referred to herein interchangeably as a trackpad) is a pointing device featuring a tactile sensor, which is a specialized surface that can translate the motion and position of a user's fingers to a relative position on screen. Touchpads are a feature of laptop computers or mobile devices, and are also used as a substitute for a mouse, for example where desk space is scarce. Because they vary in size, they can also be found on personal digital assistants and portable media players. Wired or wireless touchpads are also available as accessories.

Sometimes, a trackpad's firmware does not function well in association with input from the trackpad. The firmware associated with the trackpad of a computing system may do a poor job of mapping from a raw grid of sensors associated with the trackpad to a location where individual fingers are actually located on the trackpad. This may occur because a trackpad does not have enough sensors to accurately sense finger movement. Further, an algorithm used to find a center between sensors on the raw grid (i.e., a centroiding algorithm) may not function well, resulting in jagged cursor movement instead of smooth movement. Alternatively or additionally, hardware sensors on the trackpad may be spaced too far apart to sense certain finger movement accurately. For example, if a finger spans multiple sensors or is moving on a line between a row of sensors, the firmware may pick the wrong sensor points. Every time the hardware samples the sensor points it may make a decision about where the finger appears to be located but may periodically pick the wrong sensor as the center point.

If these issues occur, they result in a poor user experience. A display of the computing system might not provide a smooth line of movement even when a finger is moving smoothly. Instead, the system may process the finger input (vertical, horizontal, two-finger input, etc.) as a bunch of points grouped together followed by a jump and then another group of points together. Another example of poor user experience is when a user moves a finger a tiny bit on a trackpad, but a big jump occurs on the display. Yet another example of a poor user experience that occurs is finger wobble that results in unintended movement, for example when a finger is first placed on a trackpad.

Some systems may attempt to resolve poor user experience by "smoothing" out data or otherwise averaging midpoints of user input data, but this may result in an inaccurate display of what the user intended. Accordingly, there exists a need to process and filter movement on a trackpad using new techniques.

SUMMARY

According to one general aspect, a trackpad system to filter movement may include a surface, a sensor operably coupled to the surface, a controller operably coupled to the sensor, a bus operably coupled to the controller, a device driver configured to communicate with the bus, and a gesture module configured to communicate with the device driver. The gesture module may include instructions to determine if each contact detected on the surface for an input frame was previously present on the surface. If the contact was previously present on the surface, the system computes, for each axis, position changes for the contact based on a record associated with the contact. The system may determine if the position changes are unexpected based on a set of rules. If the position changes are unexpected, the system may suppress a display of movement associated with the contact for the input frame for the axis.

According to another general aspect, a method for filtering movement on an input device of a computing device may include, for each contact detected on a surface of the input device for an input frame: in response to detecting the contact on the surface, determining if the contact was previously present on the surface for the previous two input frames. If the contact was previously present on the surface for the previous two input frames, for each axis the method may include computing position changes since each of the previous two input frames for the contact based on a record associated with the contact; determine if the position changes are unexpected based on a set of rules; if the position changes are unexpected, suppressing a display of movement associated with the contact for the input frame for the axis; and if the position changes are not unexpected, allowing the display of movement associated with the contact for the input frame for the axis.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

An input device for use with a computing device can be used to communicate with and control operations of a computing device. The input device can be configured to be contacted by a user on a top surface of the input device to trigger an electronic signal within the computing device. For example, a user can slide or move one or more fingers, or, in some cases, knuckles or a portion of a hand, across the top surface of the input device to move a curser visible on a display of the computing device. The input device can also include a "click" function to allow the user to for example, click or select items on the display, or to actuate a right click function. Various input devices described herein can allow a user to actuate a click function by exerting or applying a force on a top surface of the input device at any location on the top surface. In some implementations, the input device may not have a specific sensor location that the user finds to actuate a click function. In other implementations, the input device may include a portion (e.g., a bottom third of a trackpad) that the user may depress (e.g., with a certain amount of pressure) to actuate a click function. The input device can also travel a consistent vertical distance and provide a consistent tactile response to the user when the user clicks on any portion of the top surface of the input device.

If a finger movement on the trackpad causes a jump on a display of the computing device, the device may determine that the jump appears to be unexpected (meaning that the movement differs in various ways from movements in recent history). The device may filter input data by reviewing recent history, for example by reviewing the two most recent input frames associated with a contact on the trackpad. The system may tag an input frame with a flag to indicate the movement is unexpected, and suppress display of the unintended movement for that input frame, while continuing to process input from other contacts on the trackpad for that input frame. The two most recent input frames may be utilized to calculate position deltas for each axis (x and y).

As used herein, a reference to a top view in a figure refers to a view as viewed by a user during use of an input device. For example, a top view can refer to a view of the input device as disposed within a computing device such that the user can contact the top surface of the input device to initiate an action within the computing device.

Figure 1A:
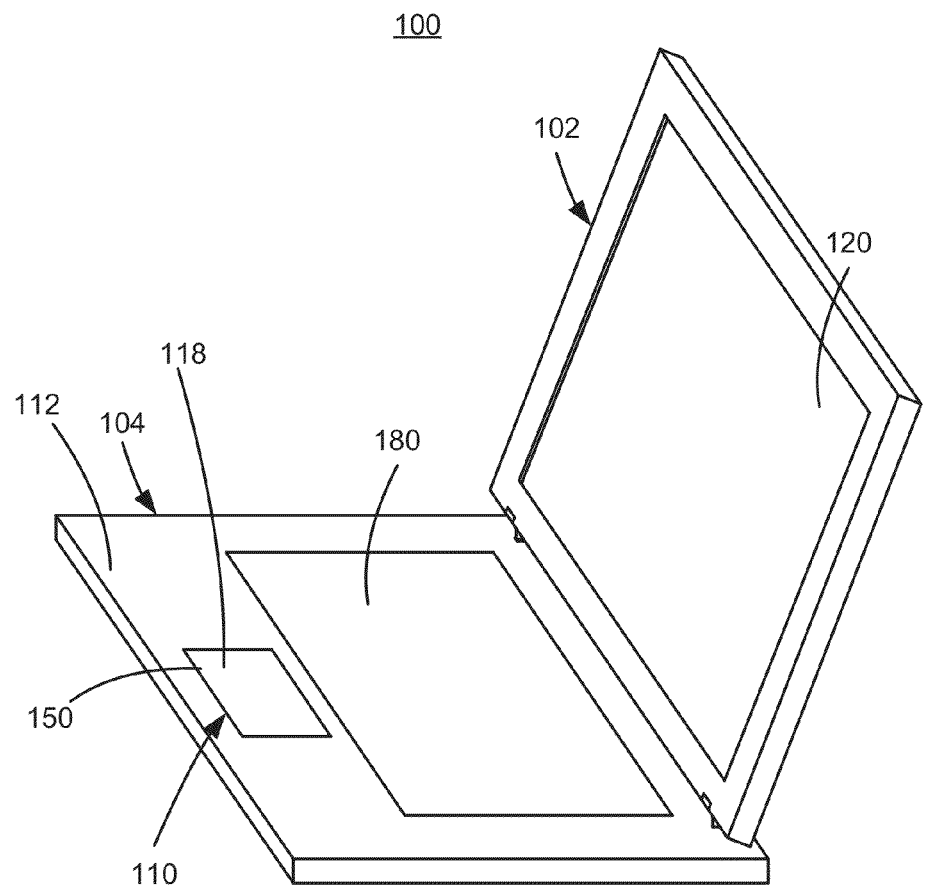
FIG. 1A is a block diagram of a computing device including an input device, according to an implementation described here.

FIG. 1A is a block diagram of a computing device including an input device, according to an implementation described here. Computing device 100 includes a display portion 102 and a base portion 104. Display portion 102 may include a display 120 that can be, for example, a liquid crystal display (LCD), a light emitting diode (LED) display, or other type of electronic visual display device. The base portion 104 can include, among other components, a trackpad 110, a housing 112, and a keyboard portion 180.

The trackpad 110 can include a cover member 118, a sensor (not shown), and a top surface 118, configured to receive inputs (e.g., a touch, swipe, scroll, drag, click, hold, tap, combination of inputs, etc.) by a user. The sensor can be activated when a user enters an input on the top surface 118 of the trackpad 110, and can communicate electronic signals within the computing device 100. The sensor can be, for example, a flame-retardant class-4 (FR3) printed circuit board. Other components, such as a dome switch, adhesive sheets, and cables (not shown) may also be integrated in computing device 100 to process input by a user via trackpad 110 or keyboard 180. Various elements shown in the display 120 of the computing device 100 may be updated based on various movements of contacts on the trackpad 110 or keyboard 180.

Trackpads, such as trackpad 110, may be used in self-contained portable laptop computers such as device 100, and do not require a flat surface near the computer. The trackpad may be position close to the keyboard 180. The trackpad 110 may only use very short finger movements to move a cursor across the display 120. While advantageous, this also makes it possible for a user's thumb to move the mouse cursor accidentally while typing, or for a user to unintentionally move the cursor, for example when a finger first touches the trackpad 110. Trackpad functionality is also available for desktop computers in keyboards with built-in touchpads, and in mobile devices, as described in more detail below with respect to FIG. 8.

The components of the input devices (e.g., 110, 180) described here can be formed with a variety of different materials such as plastic, metal, glass, ceramic, etc. used for such components. For example, the cover member 118 and base member 104 can each be formed, at least in part, with an insulating material and/or conductive material such as a stainless steel material, for example, SUS301 or SUS304.

Some touchpads and associated device driver software may interpret tapping the trackpad surface 118 as a click, and a tap followed by a continuous pointing motion (a "click-and-a-half") can indicate dragging. Tactile trackpads may allow for clicking and dragging by incorporating button functionality into the surface of the trackpad itself (e.g., surface 118). To select, a user may press down on the surface 118 instead of a physical button. To drag, instead performing a "click-and-a-half" technique, a user may press down while a cursor is positioned on the object in display area 120, drag without releasing pressure, and let go when done. Trackpad drivers (not shown) can also allow the use of multiple fingers to facilitate other mouse buttons (such as two-finger tapping for a center button).

Some trackpads have "hotspots," which are locations on the trackpad used for functionality beyond a mouse. For example, on certain trackpads, moving the finger along an edge of the trackpad may act as a scroll wheel, controlling the scrollbar and scrolling the window in a display that has the focus (e.g., scrolling vertically or horizontally). Certain trackpads may use two-finger dragging for scrolling. Additionally, some trackpad drivers support tap zones, regions where a tap will execute a function, for example, pausing a media player or launching an application. All of these functions may be implemented in trackpad device driver software, and these functions can be modified or disabled.

Computing devices, such as device 100, may feature multitouch trackpads such as input device 110, which can sense any number of fingers (such as up to five, or more) simultaneously, providing more options for input, such as the ability to bring up a menu by tapping two fingers, dragging two fingers for scrolling, or gestures for zoom in or out or rotate. Additionally, although input device 110 is depicted as a rectangle, it will be appreciated that input device 110 could be formed in a different shape, such as a circle, without departing from the scope of the techniques described here.

Figure 1B:
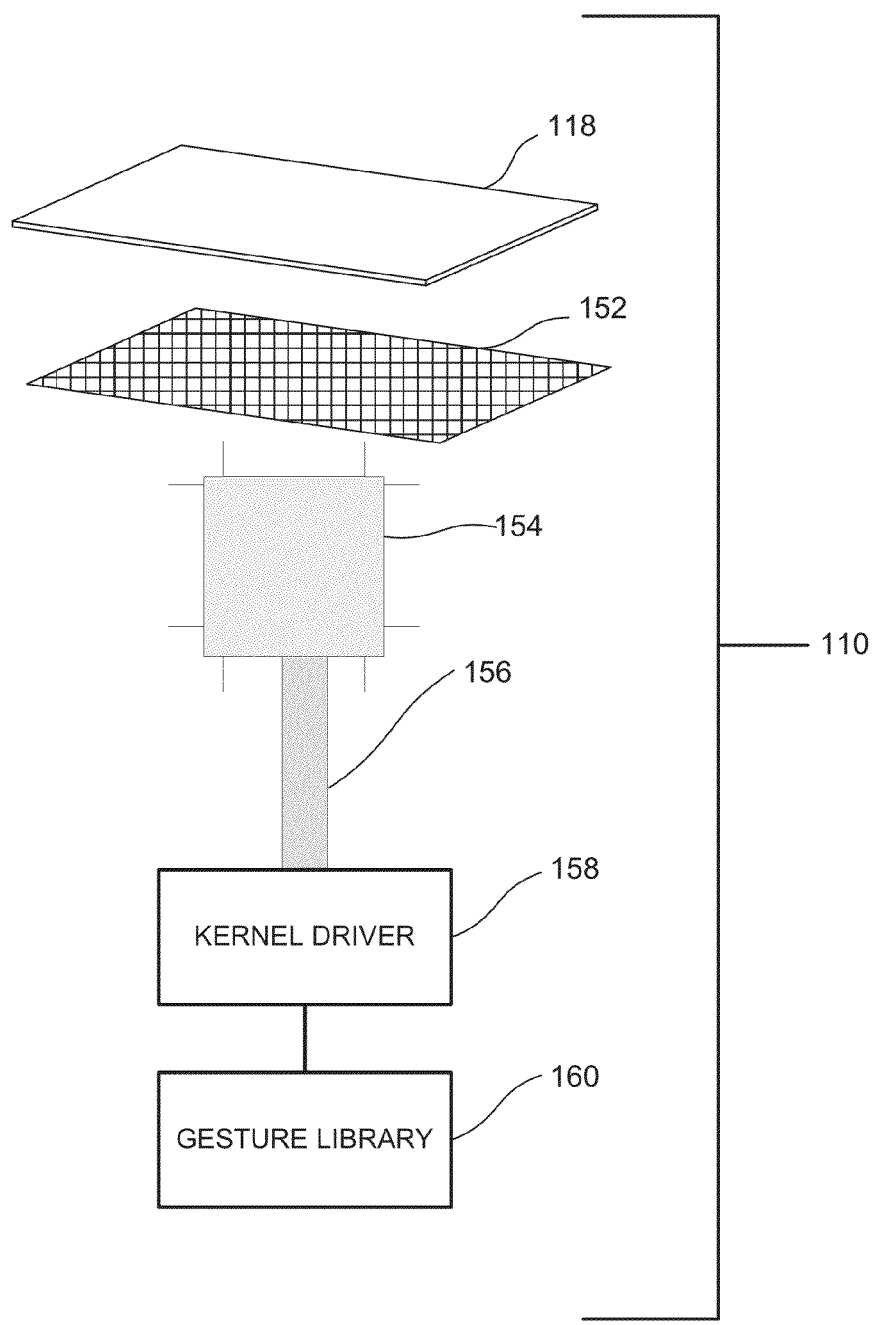
FIG. 1B is a block diagram of a trackpad and related components, according to an implementation described here.

FIG. 1B is a block diagram of a trackpad and related components, according to an implementation described here. Trackpad 110 includes surface 118, sensor 152, controller 154, bus 156, kernel driver 158, and gesture library 160.

Surface 118 may be configured to be contacted by a user to actuate and trigger an electrical response within the computing device 100. Surface 118 may be operably coupled to sensor 152. Sensor 152 can be activated when a user enters an input (e.g., a touch, swipe, or a click) on the top surface 118 of the trackpad 110. The sensor 152 can be, for example, a flame-retardant class-4 (FR4) printed circuit board. Controller 154 may be operably coupled to sensor 152. Controller 154 may be an embedded microcontroller chip and may include, for example, read-only firmware. Controller 154 may include a single integrated circuit containing a processor core, memory, and programmable input/output peripherals. Bus 156 may be a PS/2, I2C, SPI, WSB, or other bus. Bus 156 may be operably coupled to controller 154 and may communicate with kernel driver 158. Kernel driver 158 may include firmware and may also include and/or communicate with gesture library 160. Gesture library 160 may include executable code, data types, functions, and other files (such as JAVASCRIPT files) which may be used to process input to trackpad 110 (such as multitouch gestures). Gesture library 160, in combination with kernel driver 158, bus 156, controller 154, sensor 152, and surface 118, may be used to implement various processes, such as the process described in more detail below with respect to FIG. 6, for example.

Figure 1C:
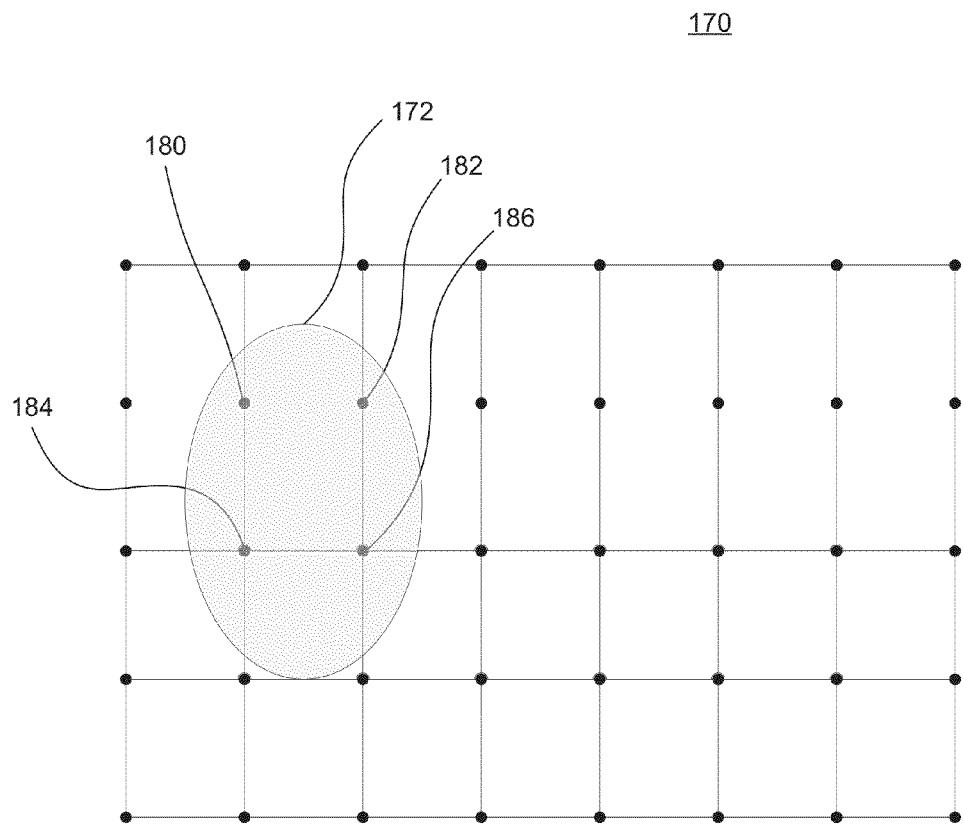
FIG. 1C is a block diagram of a sensor grid, according to an implementation described here.

FIG. 1C is a block diagram of a sensor grid 170, according to an implementation described here. The sensor grid 170 may be included as part of input device 110, such as part of sensor 152 shown in FIG. 1B. Other implementations are possible, and the specific depiction of sensor grid 170 shown in FIG. 1C is merely for illustration. For example, the grid may have any number of columns and rows, such as 9 columns and 12 rows, and may be formed in another shape (e.g., circular). The sensor grid 170 may include any number of sensors, such as sensors 182, 184, 186, and 188. The sensors may be spaced any distance (such as a few millimeters) apart from each other and may be designed to sense tactile input. Input 172, which may be a fingerpad, represents a position on grid 170 when a user places a finger on the input device 110. As shown in FIG. 1C, input 172 may span several rows and columns of sensors on grid 170 such that it may be difficult for input device 110 to determine the center of input 172. When input 172 moves across grid 170, a finger may be moving smoothly, but hardware such as grid 170 may report information about the finger movement incorrectly because the grid 170 is not that dense. When input 172 spans multiple sensors the input device may choose the wrong sensor, as discussed in more detail below with respect to FIG. 4. As discussed in more detail below with respect to FIG. 6, a process for filtering movements may be utilized to prevent jumps on a display as a result of the input.

Figure 2A:
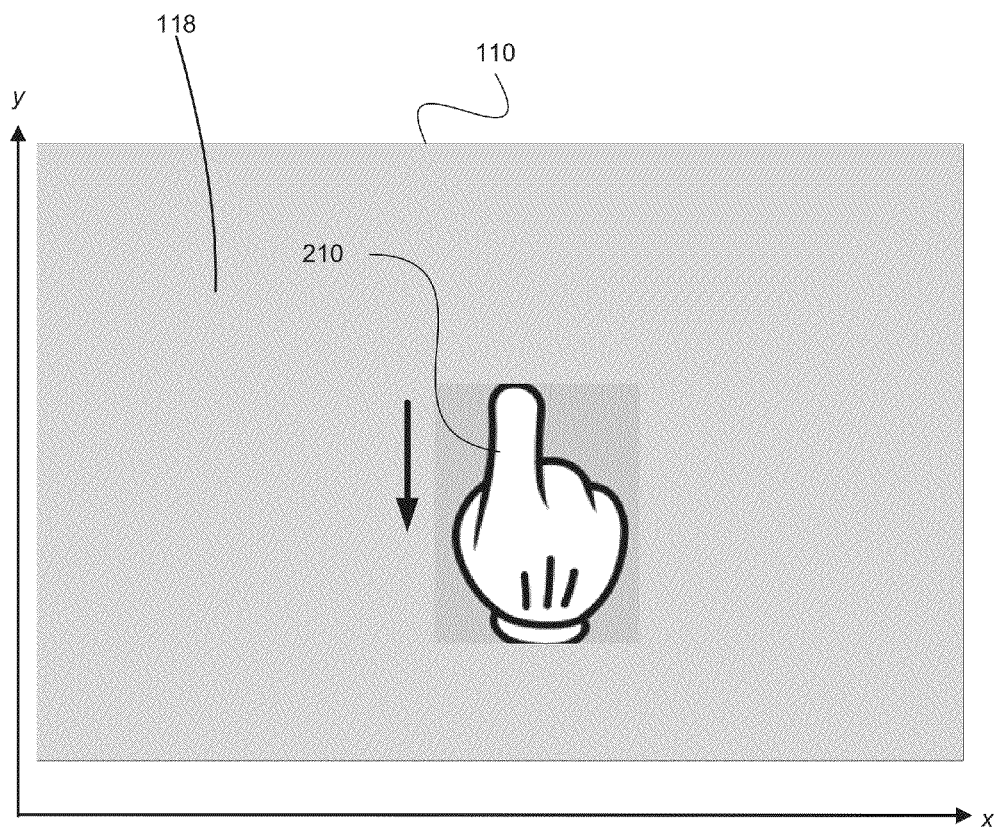
FIG. 2A is a block diagram of a top view of an input device, according to an implementation described here.

FIG. 2A is a block diagram of a top view of an input device, according to an implementation described here. Input device 110 may be a trackpad including surface 118. A contact, such as finger 210, may exert pressure on surface 118, such as scrolling downward on the trackpad. In some cases, for example when the finger 210 is first set on trackpad 110, the center of a finger 210 that sets the (x, y) coordinate on the trackpad 110 unintentionally moves slightly, represented by lines 220. This unintentional movement may cause a cursor to wobble within a display area 120 of the display 120 of the computing device 100 shown in FIG. 1A. Alternatively or additionally, when the first portion of a finger 210 first touches trackpad 110, the trackpad may recognize this as a movement or click, even though the entire fingerpad has not yet touched the trackpad and the user did not intend to move the cursor or to click yet.

Figure 2B:
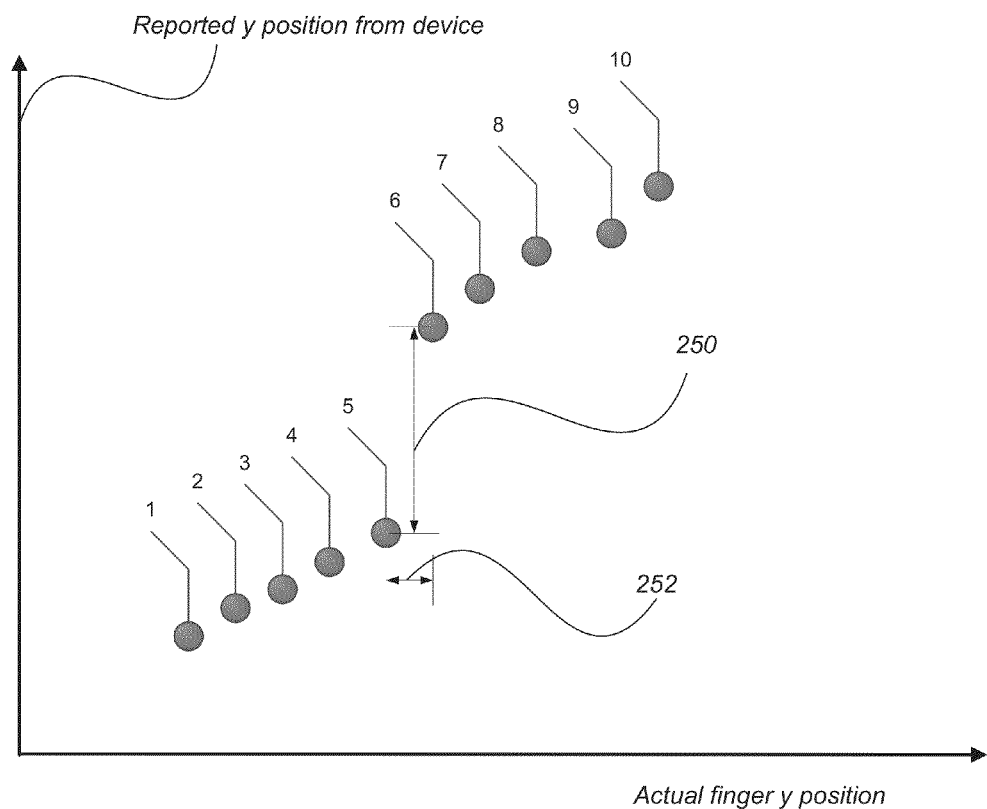
FIG. 2B is a diagram of data from input frames from an input device, according to an implementation described here.
Figure 2C:
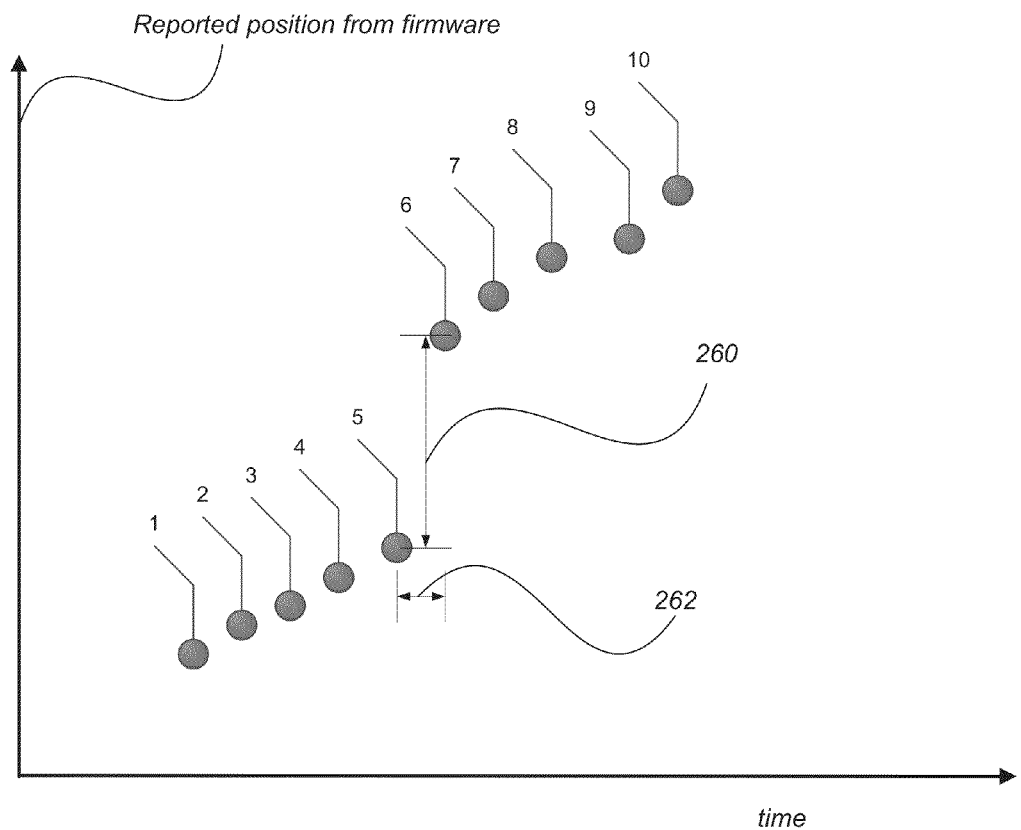
FIG. 2C is a diagram of data from input frames from an input device, according to an implementation described here.
Figure 2D:
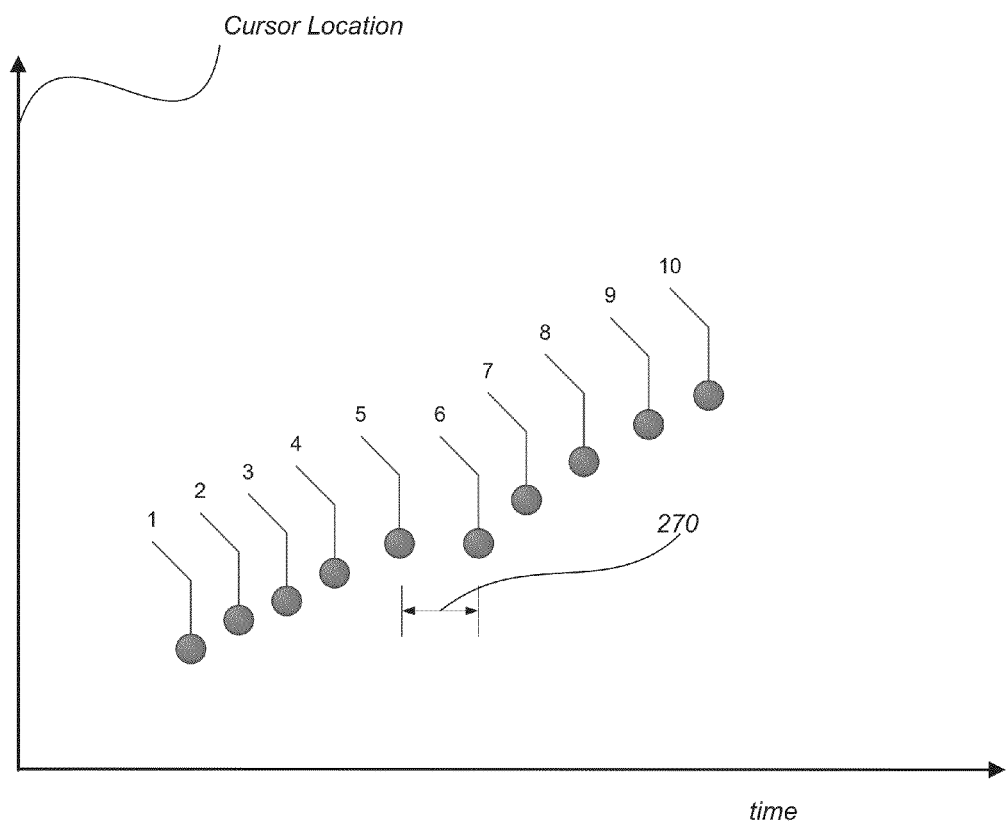
FIG. 2D is a diagram of a cursor location on a display over time, according to an implementation described here.

FIGS. 2B, 2C, and 2D illustrate what may happen when a single finger moves downward on an input device (e.g., as shown in FIG. 2A), but there is problematic data from the firmware. As shown in FIG. 2B, ten consecutive frames of input (1-10) are shown, which relate to a gesture by a user on a trackpad (i.e., the single finger moving downward on the trackpad shown in FIG. 2A). For each frame of input (1-10), FIG. 2B depicts an actual y-axis position of a contact, and the y-axis position of the contact as reported by the firmware of the input device. As an example, there may be a large jump in reported distance 250 (but not actual distance 252) between time 5 and 6.

Movement may be detected by a sensor grid of an input device and displayed on a screen of a computing device in real time (for example, as a cursor, scroll bar, or other movement). Movement may also be detected and suppressed for various reasons, such as if the movement is considered suspicious due to a large jump in movement over a short period of time, as shown in FIG. 2C. Additional reasons that movement may be considered suspicious and therefore suppressed are discussed in more detail below.

As shown in FIG. 2C, an analysis is performed, as described in more detail below with respect to FIGS. 6-7. The position of a contact as reported by the firmware is shown over time. At time 6, the movement is considered suspicious due to the large jump in distance (shown by distance 260) from time 5 to time 6 (shown by time 262), and thus a movement related to the contact may be suppressed on a display, as shown and explained in more detail below with respect to FIG. 2D.

FIG. 2D is a diagram of a cursor location on a display over time. FIG. 2D shows a location of the cursor on a display as a result of the gesture described above with respect to FIG. 2B. From time 5 to 6 as shown by area 270, the position of the cursor does not move on the display, because it has been suppressed.

Figure 3:
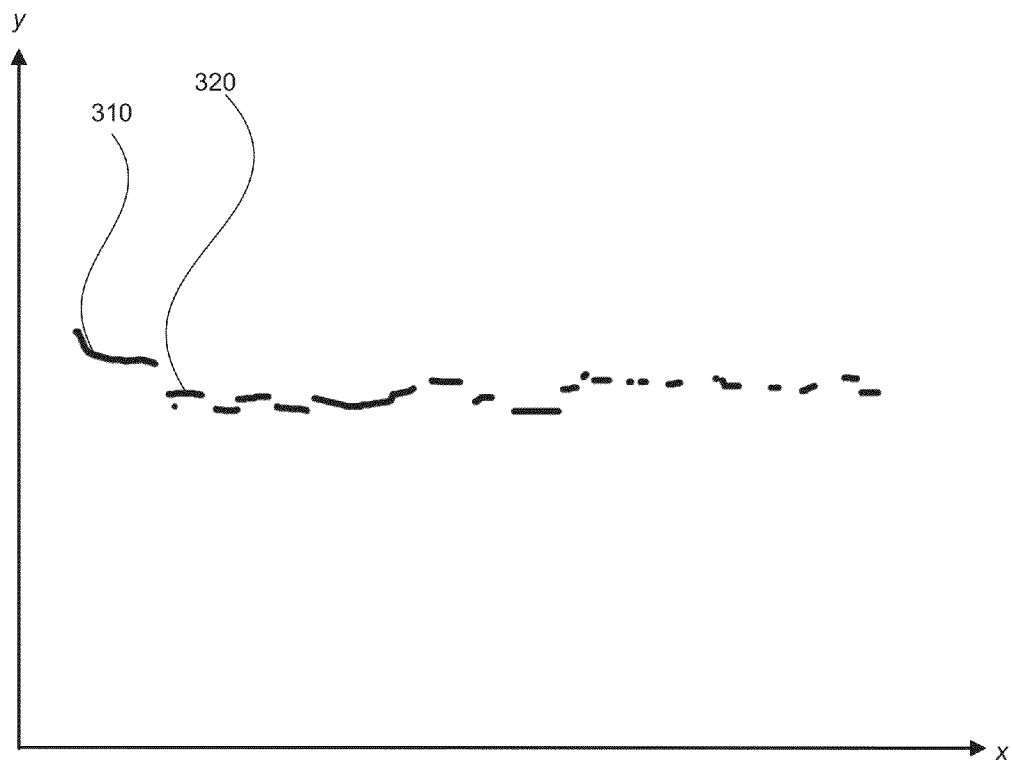
FIG. 3 is a block diagram of an example of movement detected by a sensor grid, according to an implementation described here.
Figure 4:
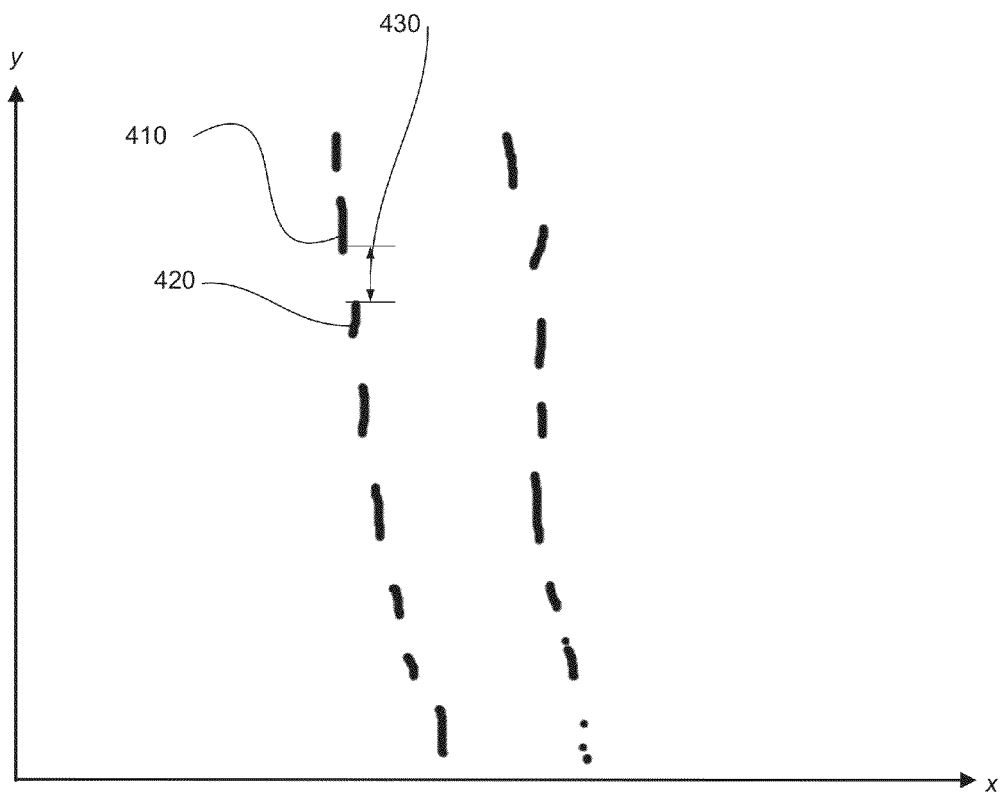
FIG. 4 is a block diagram of another example of movement detected by a sensor grid, according to an implementation described here.
Figure 5:
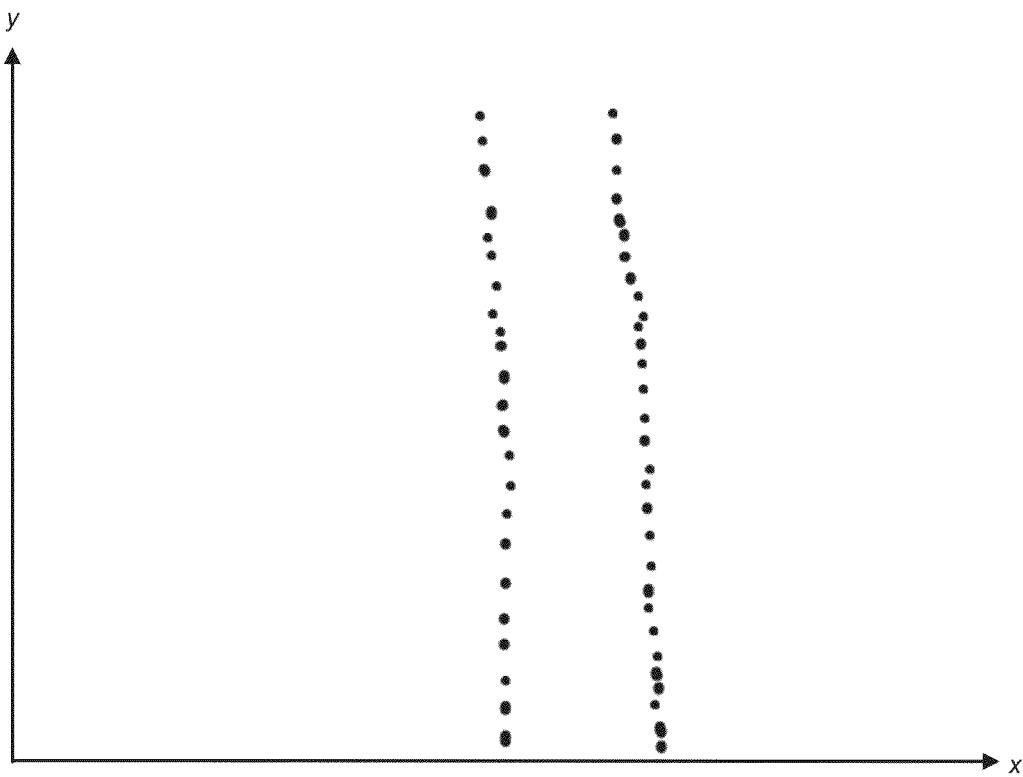
FIG. 5 is a block diagram of another example of movement detected by a sensor grid, according to an implementation described here.

FIGS. 3-5 depict movement on an input device such as a trackpad in real-time as processed by a computing device. The movement shown in FIGS. 3-5 does not correspond to a cursor location on a display, such that the movement depicted in FIGS. 3-5 reflects the trackpad's analysis of a user's actual movement on the trackpad.

FIG. 3 is a block diagram of an example of movement detected by a sensor grid, according to an implementation described here. In this example, a sensor grid may includes various sensors as described above with respect to FIG. 1C. The line representing a processed finger movement on the trackpad is illustrated as a series of lines, and includes lines 310 and 320. A user may have moved a finger smoothly horizontally across an input device such as trackpad 110, and yet a computing device may erroneously process the input as having various jumps, which if displayed on a display of the device, would create a poor user experience. For example, as shown in FIG. 3, line 310 is above line 320 and white space illustrating a jump in movement is shown between lines 310 and 320. Similarly, two-finger movement may also be processed incorrectly as having a series of jumps or wide variations between horizontal and vertical movement, even though a smooth line of movement was intended, as described below with respect to FIG. 4.

FIG. 4 is a block diagram of another example of movement detected by a sensor grid, according to an implementation described here. FIG. 4 illustrates another example of a processed user input when a user is contacting surface 118 of an input device such as trackpad 110. The user may have intended a smooth, two-finger vertical scroll on the trackpad. Instead, the trackpad misinterpreted the user's two-finger input on surface 118, and processed the input as having various jumps. For example, lines 410 and 420 are separated by white space shown by area 430. Although the system received input data for each input frame, it appears as though the finger had been moving slowly down, then between two consecutive input frames it moved much more quickly, then resumed the slow pace, which would result in large jumps on a scrolling movement of a display area, for example as described above with respect to FIGS. 2B-D. Instead, the input should have appeared as a smooth line or as more uniform input, for example as shown in FIG. 5.

FIG. 5 is a block diagram of another example of movement detected by a sensor grid, according to an implementation described here. FIG. 5 depicts accurate movement of a finger across a sensor grid. In FIG. 5, the system has accurately captured vertical movement of two-finger scrolling on the trackpad. In contrast to the jumps between frames shown in FIG. 4, in FIG. 5 the input is spaced correctly, and illustrates an input for each frame of input data.

The system described here may, in some implementations, detect acceptable horizontal movement, determine suspicious vertical movement, and filter out the suspicious vertical movement, as described in more detail below with respect to FIGS. 6-7. A border around the edge of the input device (e.g., 2 centimeters in height and width) may be utilized so that the system does not consider new contacts that start in the border as fingers until the contacts travel toward the center some predetermined distance, at which point a system may determine whether the contact is, for example, a palm or a thumb. After palm detection happens for a given frame of input, a set of contacts may exist on the input device that are known to be non-palms. Thumb detection may also be implemented. For example, if the input device detects that a contact has a certain pressure (i.e., surface area touching the pad, which may also be known as "capacitance"), which pressure is greater than another contact, it may be considered a thumb, and may be marked as a thumb (e.g., in a record associated with the contact). After thumb detection occurs, there may still be some number of contacts on the input device. The input device may consider these contacts as fingers that can cause a gesture.

Figure 6:
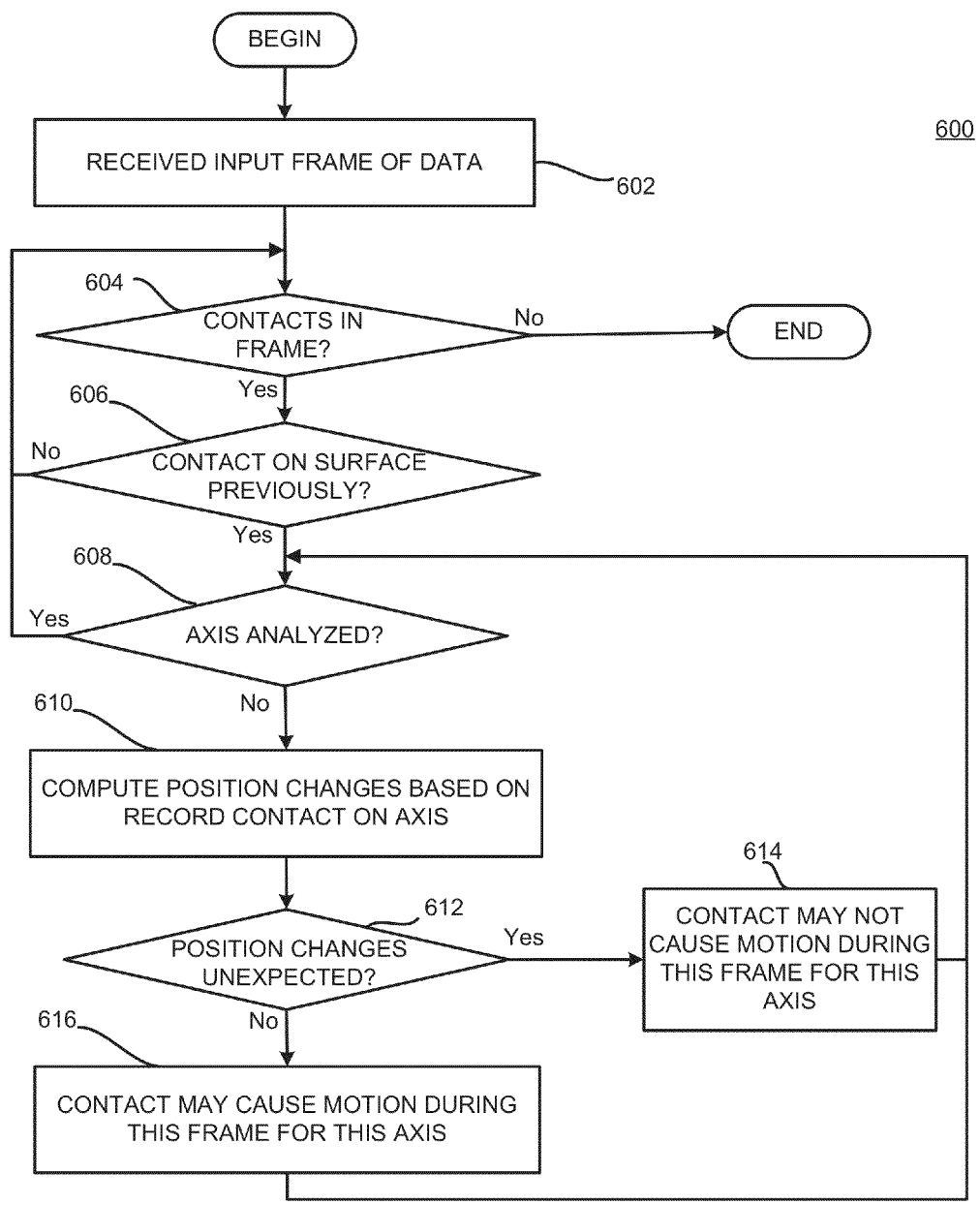
FIG. 6 is a flow diagram of an exemplary process that may be used to filter movement on a trackpad.

FIG. 6 is a flow diagram of an exemplary process that may be used to filter movement on a trackpad. Process 600 may be executed, for example, by a microcontroller of a computing device (such as controller 154 shown in FIG. 1B) and/or may be implemented as part of gesture library 160 shown in FIG. 1B. Process 600 is an example only, and may have steps added, deleted, reordered, or modified. Process 600 may be applied for each contact (e.g., finger) in every received input frame of data (602) (of which there may be, for example, 80 per second). Motion on a display of a computing device (e.g., display 120 of device 100 shown in FIG. 1) may be the result of a finger moving between two consecutive frames of input.

For each "contact" (defined here as any input on the trackpad that the trackpad recognizes as a valid input, such as a finger, thumb, etc.) that is currently on the trackpad, the computing device may maintain some information in a record. Records may be maintained per-finger. If there are three fingers on the trackpad at a given time, for example, at that time there may be three records.

A record may include any or all of the following: (1) (x, y) coordinates, such as the initial coordinate when the contact first appeared on the trackpad; and (2) a time that the contact first appeared. The record may include coordinates for various input frames, such as the current input frame, and the previous two input frames, for example.

As an illustrative example, the record may indicate the values as shown in Table 1 below:

TABLE 1

| Coordinate (x, y) | Time | Coordinate (x, y) | Time | Coordinate (x, y) | Time |
|---|---|---|---|---|---|
| 10, 20 | 3:07:01.000 AM | 10, 21 | 3:07:02.000 AM | 9, 21 | 3:07:03.000 AM |

Table 1 is an illustrative example only, and may include more than three frames of data. Further, each frame of input data may be captured in milliseconds or other measures, for example nanoseconds, or any measure of duration.

In some implementations, the trackpad itself may operate as a giant button that a user can click, such that the whole trackpad or a portion of the trackpad is clickable. In various implementations, when a button (e.g., the trackpad) goes down or up, pressure may be increasing or decreasing. For example, when a button goes up, the device may interpret the action as a user lifting a finger. In some implementations, process 600 may include determining if a button or a portion of the trackpad went up or down compared to the previous frame (not shown).

For each contact in the frame (604, yes), the process continues to the next contact. If no more contacts are in the frame (604, no), the process may end. The process determines if the contact is a new contact on the trackpad or if it was previously on the surface of the trackpad (e.g., for two previous input frames) (606). If the contact is a new contact such that it was not previously on the surface (606, no) compared to the last one or two input frames (or any other number of input frames), process 600 may create a new record associated with the contact, or replace the existing record (if any) for the finger. In some implementations, the record may be set to include the following data: (1) an (x, y) coordinate representing the current position of the contact on the trackpad; and (2) a current time. The process may continue to analyze if other contacts are in the frame (604).

Otherwise, if the contact was previously on the surface (606, yes), for example for the past two input frames, process 600 proceeds to determine if each axis has been analyzed for the contact (x and y) (608). If each axis has already been analyzed (608, yes), the process may continue to analyze if other contacts are currently present in the frame (604). Otherwise, (608, no), for each axis, the process may compute position changes based on at least one record for the contact on the axis (610). The position changes may be computed based on the record associated with the contact. For example, the system may compute, for each axis, a distance that a finger has traveled since the previous input frame, and since the second to most recent input frame. The difference from the current frame to the previous frame may be referred to as "newer-delta", and the difference from the previous frame to the one preceding previous may be referred to as "older-delta". What is newer-delta now will be older-delta after one more frame of input arrives. Thus, three locations may be used: X0 (current location), X1 (location in previous frame), X2 (location in frame before previous). The newer-delta is equal to X0-X1, and the older-delta is equal to X1-X2.

The position changes may be analyzed to determine if they are unexpected or suspicious (612), using various heuristics, which are described in more detail below with respect to FIG. 7. For example, the process may examine a total distance this contact has traveled from the coordinate in the record of the contact for the previous input frame (i.e., newer-delta) and the frame before that (i.e., older-delta). If a finger appears to have moved a certain distance across a trackpad since the previous input frame, this may indicate that the user intended to scroll across a display area of a screen, and this may not be suspicious. But, if the input indicates that the finger has changed direction, jumped a great distance, or traveled a great distance, this movement may be suspicious, and may indicate that the sensor grid of the trackpad or the firmware has incorrectly processed the input.

If the position changes are unexpected, (612, yes), the contact may not cause motion during this input frame for this axis (614). If the position changes are not unexpected, (612, no), the contact may cause motion during this input frame for this axis (616). The process may proceed to analyze the next axis, if both axes have not already been analyzed for the contact (608). As described in more detail below with respect to FIG. 7, various heuristics may be used to determine if the position changes are unexpected or suspicious as shown in block 612.

Figure 7:
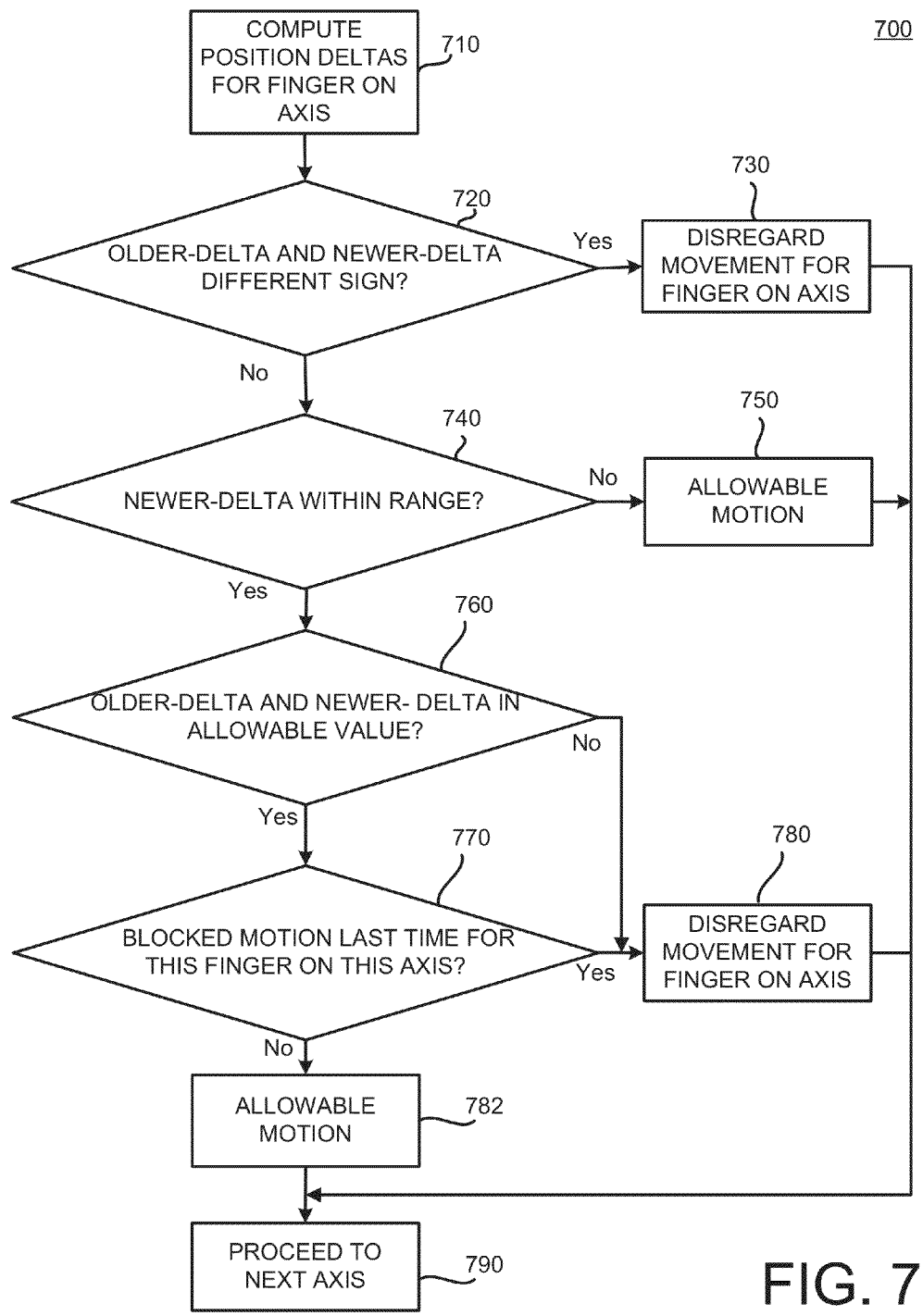
FIG. 7 shows is a flow diagram of an exemplary process that may be used to analyze movement on a trackpad.

FIG. 7 shows is a flow diagram of an exemplary process that may be used to analyze movement on a trackpad. A microprocessor of a computing device (such as device 100 shown in FIG. 1), may perform the process 700 for each contact (e.g., finger) in each frame, if the finger is currently present and was present for the previous two input frames, for example. The microprocessor may compute position deltas (changes) for a finger for each axis (710). The microprocessor may determine whether the older if the older-delta and the newer-delta have a different sign (e.g., + or −) (720).

If the older-delta and the newer-delta have a different sign (720, yes), this may indicate that the movement is unexpected because the finger has changed direction, and thus the system may disregard movement for this finger on this axis (730). The system may proceed to analyze the next axis for this finger (790).

If the older-delta and the newer-delta do not have a different sign (720, no), the microprocessor may determine if the newer-delta is within a specified range (such as between 0.9 millimeters and 7.5 millimeters) (740). If the newer-delta is not within the specified range (740, no), the motion is allowable (750), and the system may proceed to analyze the next axis for this finger (790). If the newer-delta is within the specified range (740, yes), the process may determine if the older-delta and the newer delta are both within an allowable value (760). In one implementation, the system may determine, for example, if the absolute value of the difference of the newer-delta and older-delta is under 0.9 times the older-delta.

If the older-delta and the newer delta are both within an allowable value (760, yes), and the system may proceed to determine whether it blocked motion for the previous input frame for this finger on this axis (770). If so, (770, yes), the system may disregard movement for this finger on this axis again (780). In some implementations, for example, if the system only blocked motion last time because of block 770, however, it will not block motion again this time, otherwise this finger might never cause motion. If the process did not block motion for this finger on this axis for the previous input frame (770, no), the motion is allowable (782), and the system may proceed to analyze the next axis (790).

The processes 600 and 700 may have steps added, deleted, or modified. For example, another decision block may be added to process 700 to disregard movement for the finger on the axis if none of the conditions of process 700 are met. Other implementations are also contemplated.

Although the descriptions in FIGS. 1-7 are generally focused on trackpads, the implementations described with respect to FIGS. 1-7 may also be utilized in conjunction with touch screens or any other input devices that may be used in conjunction with various displays. Additional examples of computing devices are depicted in FIG. 8, such as mobile devices and other computing systems with various input devices that may be used to filter movement.

Figure 8:
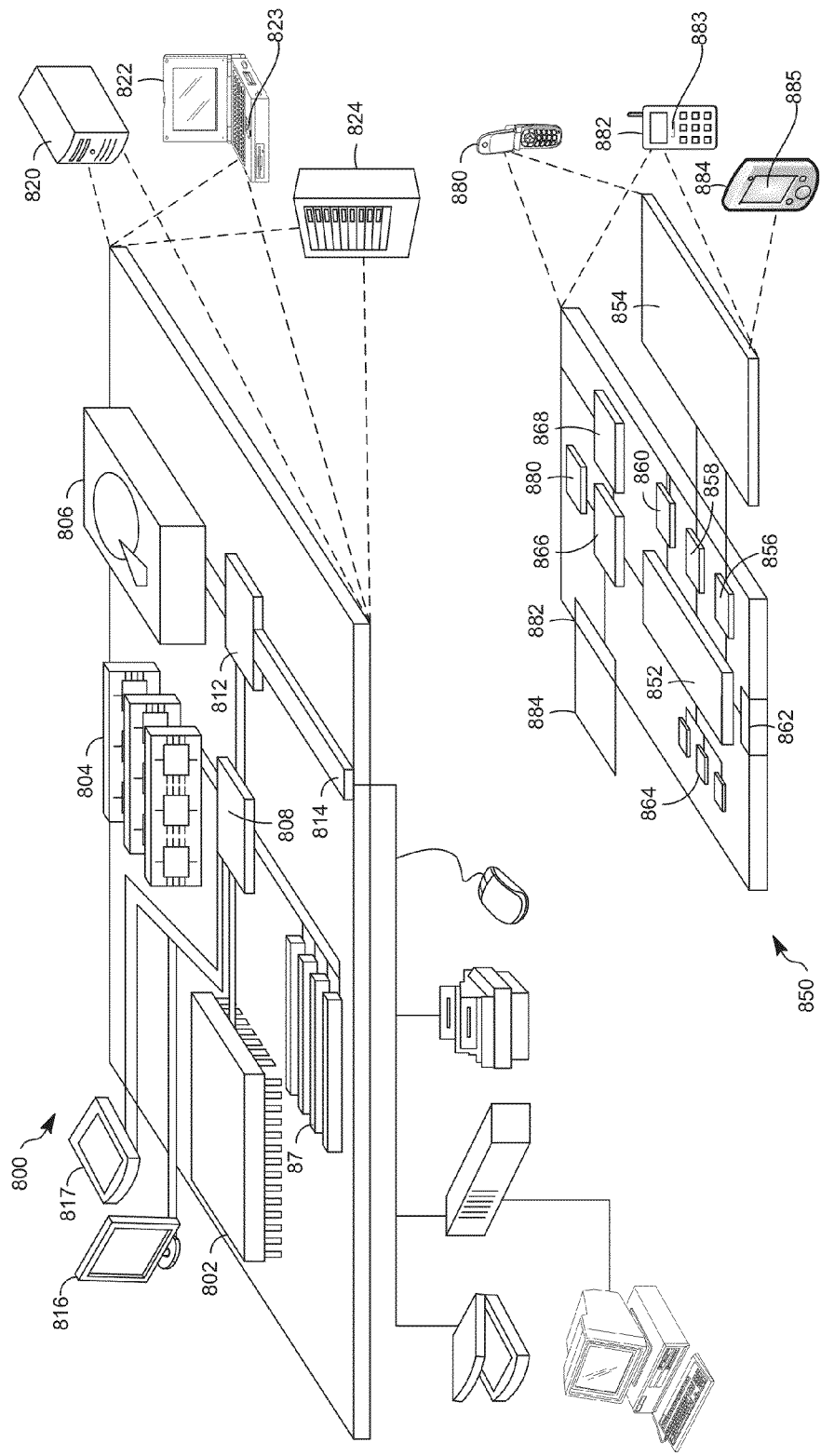
FIG. 8 shows an example of a computer device and a mobile computer device that can be used to implement the techniques described here.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816, which may be a touch screen display (e.g., through a graphics processor or accelerator), trackpad 817, and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, BLUETOOTH, ETHERNET, wireless ETHERNET) may be coupled to one or more input/output devices, such as a trackpad, keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822, including trackpad 823. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, as well as a trackpad, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, which may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882 including a trackpad 883, a smart phone 884 including a touch screen 885, a personal digital assistant, or other similar mobile device including a trackpad, touchpad, touch screen, or input device(s).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order. In addition, other steps may be provided, or steps may be eliminated, from the described flows, and other components may be added to, or removed from, the described systems. Accordingly, other implementations are within the scope of the following claims.

What is claimed is:

1. A trackpad system to filter movement, comprising:
   a surface;
   a sensor operably coupled to the surface;
   a controller operably coupled to the sensor;
   a bus operably coupled to the controller;
   a device driver configured to communicate with the bus; and
   a gesture module configured to communicate with the device driver, the gesture module including instructions to:
   for each contact detected on the surface for an input frame:
      associate a position with the contact, the position including an x-axis and a y-axis coordinate;
      in response to detecting the contact on the surface, determine if the contact was previously present on the surface; and
      if the contact was previously present on the surface, for each axis coordinate:
         compute a position change for the contact on the axis based on a record associated with the contact, the record including a previous position associated with the contact, the previous position being associated with a previous location of a cursor on a display;
         determine if the position change is unexpected based on applying a set of rules to the position change; and
         based on determining that the position change is unexpected, associate a current position of the contact with the previous location of the cursor on the display.

2. The trackpad system of claim 1, wherein the gesture module further includes instructions to:
   suppress a display of movement associated with a contact for an input frame if the contact was not previously present on the surface.

3. The trackpad system of claim 1, further comprising a record data store including records for each contact currently detected on the surface.

4. The trackpad system of claim 3, wherein each record includes: a coordinate for a current position of the contact on the surface, and a current time.

5. The trackpad system of claim 1, wherein the set of rules include determining that the position change is unexpected if a coordinate from a previous input frame of data is within a predetermined range of a coordinate of the input frame.

6. The trackpad system of claim 3, wherein the record data store is accessed to determine if the contact was previously present on the surface.

7. The trackpad system of claim 1, wherein the set of rules include:
   determining that the position change is unexpected if a newer delta and an older delta have a different direction of movement,
   the newer delta including a first comparison of a current input frame to a previous input frame, and
   the older delta including a second comparison of the current input frame to a second most recent input frame.

8. The trackpad system of claim 7, wherein the newer delta and the older delta are created based on the record associated with the contact.

9. The trackpad system of claim 8, wherein the set of rules include determining that the position change is unexpected if the newer delta is within a predetermined range.

10. The trackpad system of claim 8, wherein the set of rules include determining if the newer delta and the older delta are within an allowable value.

11. The trackpad system of claim 10, wherein the set of rules include determining if movement was blocked for the contact on the axis in the previous input frame.

12. The trackpad system of claim 10, wherein the set of rules include determining that the position change is unexpected if movement was blocked for the contact on the axis in the previous input frame.

13. The trackpad system of claim 1, wherein the input frame is associated with a measure of time.

14. The trackpad system of claim 1, wherein the set of rules include determining if the contact is currently present on the surface of the trackpad and was previously present on the surface for the previous two input frames.

15. The trackpad system of claim 1, wherein the instructions include allowing the display of movement associated with the contact for the input frame for the axis if the position changes are not unexpected.

16. The trackpad system of claim 1, further comprising a display area separate from the trackpad.

17. The trackpad system of claim 1, further comprising at least one physical button associated with the trackpad and configured to receive input from a user.

18. A non-transitory computer readable medium including instructions for filtering movement on an input device of a computing device, the instructions comprising:
for each contact detected on a surface of the input device for an input frame:
associate a position with the contact, the position including an x-axis and a y-axis coordinate value;
in response to detecting the contact on the surface, determine if the contact was previously present on the surface for the previous two input frames; and
if the contact was previously present on the surface for the previous two input frames, for each axis coordinate:
compute a position change for the contact on the axis for each of the previous two input frames for the contact based on a record associated with the contact, the record including a previous position associated with the contact, the previous position being associated with a previous location of a cursor on a display;
determine if the position change is unexpected based on applying a set of rules to the position change;
based on determining that the position change is unexpected:
suppress a display of movement associated with the contact for the input frame for the axis; and
associate a current position of the contact with the previous location of the cursor on the display; and
based on determining that the position change is not unexpected;
allow the display of movement associated with the contact for the input frame for the axis, the movement displaying the cursor in a current location different from the previous location; and
associate a current position of the contact with the current location of the cursor on the display.

19. A method for filtering movement on an input device of a computing device, comprising:
for each contact detected on a surface of the input device for an input frame:
associate a position with the contact, the position including an x-axis and a y-axis coordinate value;
in response to detecting the contact on the surface, determining if the contact was previously present on the surface for the previous two input frames; and
if the contact was previously present on the surface for the previous two input frames, for each axis coordinate:
computing a position change for the contact on the axis for each of the previous two input frames for the contact based on a record associated with the contact, the record including a previous position associated with the contact, the previous position being associated with a previous location of a cursor on a display;
determining if the position change is unexpected based on applying a set of rules to the position change;
based on determining that the position change is unexpected:
suppressing a display of movement associated with the contact for the input frame for the axis; and
associating a current position of the contact with the previous location of the cursor on the display; and
based on determining that the position change is not unexpected;
allowing the display of movement associated with the contact for the input frame for the axis, the movement displaying the cursor in a current location different from the previous location; and
associating a current position of the contact with the current location of the cursor on the display.

20. The method of claim 19, wherein the input device is a touch screen.

* * * * *

UNITED STATES PATENT AND TRADEMARK OFFICE
CERTIFICATE OF CORRECTION

| | | |
|---|---|---|
| PATENT NO. | : 8,872,781 B1 | Page 1 of 1 |
| APPLICATION NO. | : 13/534814 | |
| DATED | : October 28, 2014 | |
| INVENTOR(S) | : Andrew de los Reyes | |

It is certified that error appears in the above-identified patent and that said Letters Patent is hereby corrected as shown below:

In the Claims,

In column 15, line 43, in claim 18, delete "unexpected;" and insert -- unexpected: --, therefor.

In column 16, line 35, in claim 19, delete "unexpected;" and insert -- unexpected: --, therefor.

Signed and Sealed this
Tenth Day of March, 2015

Michelle K. Lee
*Deputy Director of the United States Patent and Trademark Office*